(No Model.)
J. R. WOTHERSPOON.
WATERING POT.
No. 518,437. Patented Apr. 17, 1894.
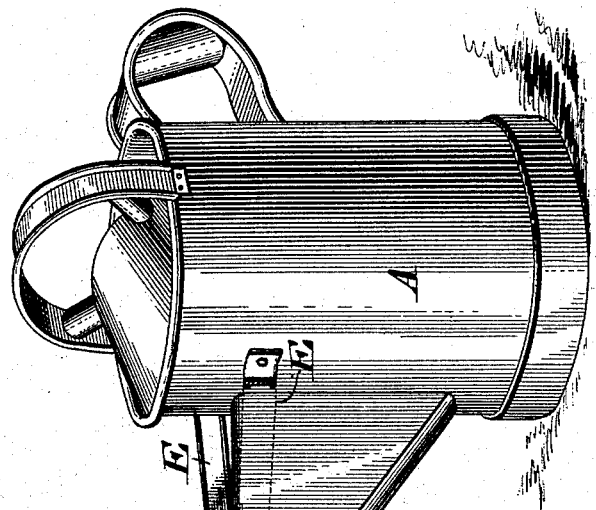
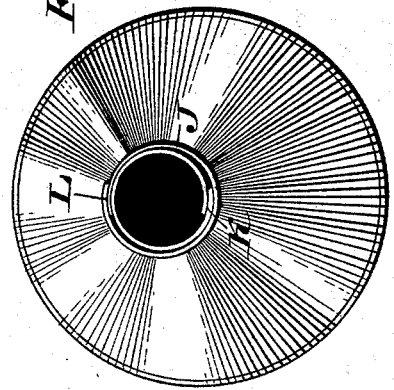
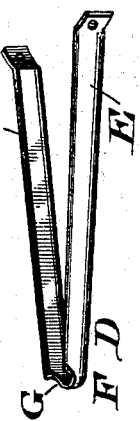
WITNESSES:
INVENTOR
James R. Wotherspoon
BY John A. Wiederskein
ATTORNEY.

UNITED STATES PATENT OFFICE.

JAMES R. WOTHERSPOON, OF PHILADELPHIA, PENNSYLVANIA.

WATERING-POT.

SPECIFICATION forming part of Letters Patent No. 518,437, dated April 17, 1894.

Application filed November 9, 1893. Serial No. 490,470. (No model.)

*To all whom it may concern:*

Be it known that I, JAMES R. WOTHERSPOON, a citizen of the United States, residing in the city and county of Philadelphia, State of Pennsylvania, have invented a new and useful Improvement in Watering-Pots or Sprinkling-Cans, which improvement is fully set forth in the following specification and accompanying drawings.

My invention consists of a watering pot or sprinkling can having a brace for the spout thereof, the same being of angular form with its limbs connected with the body, and its angle or bend provided with a recess in its upper edge in which the spout is seated and to which it is secured, thus firmly attaching the brace to the body and spout, and sustaining and strengthening the latter in a reliable manner, as will be hereinafter set forth.

It also consists in providing the branch which covers the rose with a collar which strengthens the same, and prevents opening of the joint or seam, and bursting of said branch, as will be hereinafter set forth.

Figure 1 represents a perspective view of a watering pot or sprinkling can embodying my invention. Fig. 2 represents an end view of the rose and branch thereof on an enlarged scale, and Fig. 3 represents a perspective view of the brace detached.

Similar letters of reference indicate corresponding parts in the three figures.

Referring to the drawings: A designates the body of a watering pot or sprinkling can, B the spout, and C the rose thereof, said rose being removable from the spout as usual.

D designates a brace which is somewhat of V-shape, and having the ends of its limbs E connected with the side of the body A, and its bend or angular portion F embrace the spout, said portion being formed with a recess G, in its upper edge in which the spout is seated. The brace is connected by soldering or otherwise with the body and spout, by which provision the spout is firmly secured in position and vastly strengthened, so as to be prevented from being broken-down and wrenched-off, and is otherwise well enabled to endure the severe usage to which cans of the kind are subjected.

The branch H which carries the rose C, and which is removably fitted on the spout B, is encircled by a collar J, the latter being soldered or otherwise secured to said branch, and having its joint K opposite to, or removed from the joint L of the branch, thus greatly strengthening the latter, and preventing spilling of the same at its joint K, it being well known that such branches are forcibly applied to spouts, the tendency of which is to spread the former, owing to their conical form, and consequently open the joints or seams, the effect of which is evident.

Having thus described my invention, what I claim as new, and desire to secure by Letters Patent, is—

A watering pot having a brace for the spout consisting of a bent piece with ends adapted to be secured to the body of the pot, and provided with a recess in the upper edge of its bend, forming a seat for said spout, said parts being combined substantially as described.

JAMES R. WOTHERSPOON.

Witnesses:
JOHN A. WIEDERSHEIM,
R. H. GRAESER.